June 29, 1971   M. SANDER ET AL   3,589,959

SPLICING OF POLYESTER FILMS

Filed Aug. 26, 1968

INVENTORS:
MANFRED SANDER, HEINRICH DEIBIG, MICHAEL SCHIMMEL.

United States Patent Office 3,589,959
Patented June 29, 1971

3,589,959
SPLICING OF POLYESTER FILMS
Manfred Sander, Kelkheim, Taunus, and Heinrich Deibig and Michael Schimmel, Frankfurt am Main-Roedelheim, Germany, assignors to Agfa-Gevaert Aktiengesellschaft, Leverkusen, Germany
Filed Aug. 26, 1968, Ser. No. 755,056
Claims priority, application Germany, Sept. 7, 1967, A 56,717
Int. Cl. B65h 69/02
U.S. Cl. 156—157                          3 Claims

ABSTRACT OF THE DISCLOSURE

Film having an aromatic polyester support layer has respective ends joined together by first coating an oxime on the polyester support of the respective ends in areas of the support which face in abutment at the joint, so that the oxime acts as a swelling agent and then pressing together two coated facing polyester surfaces at a temperature of between 20° and 200° C.

Figure 1:
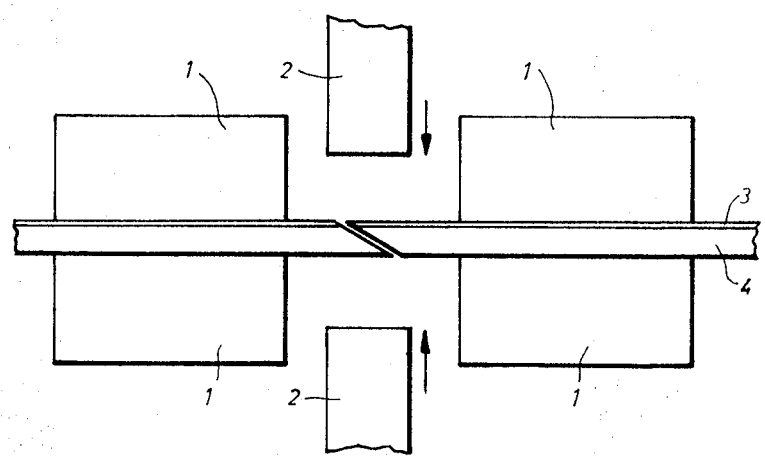

This invention relates to a process for splicing films made from aromatic polyesters by applying a suitable swelling agent to the surface to be spliced, followed by sealing at elevated temperature. The invention is applicable in particular to the splicing of motion picture films on a polyester support, polyethylene terephthalate in particular.

Stretched polyester material cannot be directly sealed by heating to beyond the point at which it melts because the material undergoes considerable shrinkage at temperatures very much lower than this. For example, the melting point of polyethylene terephthalate is above 260° C. Although sealing without shrinkage is possible by ultrasonics, this method is too expensive and for this reason cannot be used by amateur photographers.

Problems are involved in the use of reactive adhesives which, as typical all-purpose adhesives, stick not only to the polyester film but also to the instrument being used. In addition, there are only relatively few reactive adhesives which can be used for aromatic polyesters. Even this small number require long hardening times and only give splices of moderate strength.

Adhesives used for aromatic polyesters include polymers which adhere satisfactorily to polyesters and whose melting point is below the temperature critical for the dimensional stability (180° C. in the case of polyethylene terephthalate). The shear strength of splices obtained in this way is only satisfactory in a few cases, whilst their resistance to high temperatures under tensile stressing (for example, in the case of spliced motion picture films) is without exception insufficient.

Swelling agents for polyester material in general and polyethylene terephthalate in particular have been proposed for a variety of purposes. Unfortunately, the degree of swelling obtained are either insufficient for splicing, or the substances themselves cannot be used for other reasons. Halogenated acetic acids, for example, are effective solvents but at the same time are highly corrosive, whilst aniline and its substitution products deleteriously effect polyesters by chemical decomposition. Derivatives of aniline are, moreover, not useful for physiological reasons. Phenols are unsuitable on account of their unfavourable odour. These disadvantages also attend the substances described in U.S. Pat. No. 2,849,359 which are used as adhesives for polyester-based photographic films. None of these known adhesives meet practical requirements.

It is an object of the present invention to provide substances intended in particular for splicing photographic films with a polyester support which swell superficially to such an extent that sealing can be completed within a matter of seconds at temperatures below 180° C. without depriving the film to be spliced of its dimensional stability. Finally, the adhesive should be free of any unpleasant odours, physiologically unobjectionable and must not impair of the photographic properties of the films.

We now have found that aromatic polyester films can be spliced by coating the areas to be spliced with an oxime as swelling agent, followed by pressing under heat at a temperature of between 20 and 200° C.

Suitable are aliphatic, aromatic, cycloaliphatic, araliphatic or heterocyclic oximes.

According to a preferred embodiment of the invention they are applied in combination with mono- or polyphenolic compounds such as resorcinol, pyrocatechol or hydroquinone.

Particularly suitable are oximes of aldehydes or ketones of the benzene or naphthalene series.

In contrast to the splicing agents hitherto proposed, satisfactory seals can be obtained at temperatures below 100° C. Sealing at relatively low temperatures ensures that the polyester material and photographic layer will not be damaged.

Furthermore, with the oximes it is now possible, to seal polyester films to cellulose acetate films. The splicing agents of the present invention are useful for splicing photographic films as well as magnetic tapes having a polyester support.

Films or foils of aromatic polyesters preferably with a high aromatic component content can be spliced with the aforementioned substances. The splicing method of the invention is particularly suitable for polyesters derived from terephthalic acid or isophthalic acid, and straight-chain or branched glycols in particular ethylene glycol.

Splicing is preferably carried out with an overlap, whereby even very small overlaps yield joins of high strength. As shown in FIG. 1, the wedge-shaped splices normally used for cinematographic films, can also be applied. For this purpose, the ends of the film to be joined are scraped off in the form of a wedge so that the overall thickness of the splices obtained is equal to the thickness of the film. The width of splices of this kind is little more than a millimeter.

It is self explanatory that with the process of the invention two surfaces of polyester are spliced. If the photographic film to be spliced is coated on one side with a layer of another material, for example, the image-carrying gelatin layer, that part of the coating projecting into the area at which the splice is to be made has to be removed beforehand. This may be done either mechanically or chemically. The swelling agent is then applied either to one or to both the surfaces to be sliced by brush coating, spraying, immersion or any other conventional method.

One of the aforementioned substances or a mixture of several of them can be applied. The swelling agent may be diluted with a readily volatile solvent, for example, acetone, methanol, dioxane, methylene chloride and so on. This is particularly desirable in the case of swelling agents which are solid at room temperature. It is occasionally of advantage to add high boiling solvents (for example, dimethyl formamide, dimethyl sulfoxide, butyrolactone, N-methyl pyrrolidone, isophorone, benzyl alcohol and so on).

Other swellnig agents may also be included, such as aromatic aldehydes, alkoxy phenols and coumarin derivatives. Dyes, surface active substances or odoriferants may also be added in small quantities, although the addition of larger quantities of non-swelling substances reduces the efficiency of the bonding agent.

After the swelling agent has been applied, the surfaces to be spliced are placed on top of one another and heated under slight pressure in a suitable apparatus. With some of the aforementioned swelling agents, a temperature of 100° and below is sufficient to obtain a good splice. In general temperatures of between 120° C. and 140° C. have proved sufficient to obtain excellent splices. In most cases periods of only a few seconds are sufficient. Heating may be carried out as required, for example, by means of a heating plate, infra-red heating and so on.

To obtain a good splice, the sealing zone is heated under a pressure of 0.1 to 1 kg. wt./mm.$^2$ for 1 second to 10 minutes depending on the sealing temperature.

Figure 2:
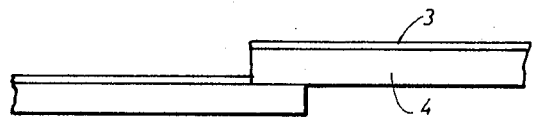

In FIG. 1, a photographic layer 3 contains the image and a polyethylene terephthalate support 4 is associated with the layer 3. The ends of the film are held in a holder 1. The ends of the film are in a position to be pressed together by metal dies 2. The ends of the film are shaved and the shaved ends fitted together. In FIG. 2 the film comprised of the photographic layer 3 and support 4 is shown also. In FIG. 2 the ends to be spliced are not shaved. It will be understood that the areas of the film which abut are the facing areas and the swelling agent is applied to the facing areas.

To determine the sealing efficiency of the tested adhesive, the ultimate tensile strength, shear strength and heat resistance of the sealed areas were determined.

The ultimate tensile strength was measured in a tension testing machine with a distance of 50 mm. between the grips and a speed of movement of 100 mm./min. The shear strength was determined by deflecting the sealed film samples through 180° over a roller of 8 mm. diameter and 1 kg. wt. weight. The figures quoted below indicate the reciprocal movements of the sealed areas over the roller at an amplitude of 4 cm. and a frequency of 2 c./s.

The heat resistance was tested by keeping the sealed area under a tensile load of 1 kg. wt. at 80° C. and indicates that the sealed area remains intact for more than 5 minutes. In Examples 2 to 41, only the ultimate tensile strength is given since welded areas that have a high ultimate tensile strength also have sufficient shear strength and satisfactorily withstand heating to 80° C.

The following values were obtained for the unsealed polyester film (average of 5 measurements):

Tensile strength: 9.3 kg. wt.
Shear strength: >10,000
Heat resistance: +

The values given in the examples are each the average of 5 measurements.

In most cases periods of only a few seconds are sufficient. Heating may be carried out as required, for example, by means of a heating plate, infra-red heating and so on.

EXAMPLE 1

An 8 mm. motion-picture film perforated along outside having a polyethylene terephthalate support for the photographic emulsion was cut on a conventional sealing press and scraped off to give wedge-shaped ends. A 30% solution of salicylic aldehyde oxime in acetone was applied to the two sealing areas which were above 1.5 mm. in width, and the acetone was left to evaporate.

The ends of the film were then laid on top of one another in a holder 1 (compare FIG. 1) and pressed together under slight pressure of 0.3 kg. wt. mm.$^2$ for about 10 seconds by means of the metal die 2 (FIG. 1) heated to 120° C. In FIG. 1, 3 denotes the photographic layer containing the image and 4 the polyethylene terephthalate support. The splice obtained was optically clear and showed outstanding mechanical strength. Tests to determine tensile strength, shear strength and resistance to heat under tensile stressing yield the following results.

Tensile strength: 9.3 kg. wt.
Shear strength: >10,000
Heat resistance: +

EXAMPLES 2–13

Polyester fims were sealed with oximes under the conditions of Example 1 at various temperatures.

| Example | Adhesive | Sealing temperature, °C. | Ultimate tensile strength, kg. wt. |
|---|---|---|---|
| 2 | 2-hydroxyacetophenone oxime | 120 | 6.9 |
| 3 | 3-hydroxybenzaldehyde oxime | 120 | 5.9 |
| 4 | 3-nitrobenzaldehyde oxime | 130 | 7.3 |
| 5 | 2-chlorobenzaldehyde oxime | 130 | 6.1 |
| 6 | 2,4,6-trichlorobenzaldehyde oxime | 140 | 7.5 |
| 7 | 2-hydroxynaphthaldehyde oxime | 140 | 5.5 |
| 8 | 3-nitroacetophenone oxime | 140 | 7.4 |
| 9 | Benzaldehyde oxime | 140 | 7.5 |
| 10 | Furfurol oxime | 140 | 5.3 |
| 11 | Acetophenone oxime | 160 | 5.8 |
| 12 | Cinnamic aldehyde oxime | 170 | 7.9 |
| 13 | Diacetylmonoxime | 170 | 7.4 |

EXAMPLE 14

The photographic layer was removed from an 8 mm. polyester film over a width of about 1.5 mm. A 50% solution of salicylic aldoxime in ethanol was applied to the two surfaces to be sealed. When the solvent had evaporated, the sealing area was heated to 140° C. under a pressure of 0.3 kg. wt./mm.$^2$ for 2 seconds. An ultimate tensile strength of 7.9 kg. wt. was obtained.

EXAMPLE 15

A 40% solution of 2-hydroxyacetophenone oxime in ethyl acetate was applied to an area to be sealed which had been prepared for splicing. After the solvent had evaporated off, the area to be sealed was heated to 130° C. for 4 seconds under a pressure of 0.3 kg. wt./mm.$^2$. An ultimate tensile strength of 7.6 kg. wt. was obtained.

EXAMPLES 6 TO 23

A 30% solution of a 1:1 mixture of salicylic aldoxime and resorcinol in acetone was applied to an area to be sealed which had been prepared for splicing, and the solvent was evaporated off. The areas were joined under a pressure of 0.3 kg. wt./mm.$^2$ for different times and at different temperatures. The following results were obtained:

| Example | Sealing temperature, °C. | Sealing time, seconds | Ultimate tensile strength, kg. wt. |
|---|---|---|---|
| 16 | 50 | 1,000 | 1.6 |
| 17 | 60 | 120 | 2.9 |
| 18 | 70 | 120 | 4.6 |
| 19 | 80 | 60 | 4.1 |
| 20 | 90 | 60 | 6.8 |
| 21 | 100 | 10 | 8.1 |
| 22 | 110 | 3 | 5.5 |
| 23 | 120 | 1 | 7.2 |

EXAMPLES 24 TO 35

The following results were obtained for the 1:1 mixtures of splicing agents indicated below under the sealing conditions of Examples 16 to 23:

| Adhesive | Sealing temperature, °C. | Sealing time, seconds | Ultimate tensile strength, kg. wt. |
|---|---|---|---|
| Example: | | | |
| 24 ... 3-nitrobenzaldehyde oxime/2-chlorobenzaldehyde oxime | 120 | 10 | 6.9 |
| 25 ... 3-nitrobenzaldehyde oxime/2-hydroxybenzaldehyde oxime | 120 | 10 | 6.7 |
| 26 ... 2-chlorobenzaldehyde oxime/2-hydroxyacetophenone oxime | 120 | 10 | 6.5 |
| 27 ... 3-hydroxybenzaldehyde oxime/2-hydroxyacetophenone oxime | 120 | 10 | 7.0 |
| 28 ... Salicylic aldoxime/2-hydroxyacetophenone oxime | 120 | 5 | 7.4 |
| 29 ... Salicylic aldoxime/hydroquinone | 120 | 10 | 5.2 |
| 30 ... Salicylic aldoxime/pyrocatechol | 110 | 10 | 6.7 |
| 31 ... Salicylic aldoxime/2-methylresorcinol | 110 | 10 | 6.6 |
| 32 ... 2-chlorobenzaldehyde oxime/resorcinol | 110 | 10 | 6.9 |
| 33 ... 2-hydroxyacetophenone oxime/resorcinol | 120 | 5 | 8.4 |
| 34 ... do | 110 | 10 | 7.9 |
| 35 ... do | 100 | 10 | 6.3 |

EXAMPLE 36

2.5 mg. of w-hydroxyacetophenone oxime suspended in methylene chloride were applied to an area prepared for splicing, and the dispersing agent was evaporated off. After sealing, under the conditions of Example 1, an ultimate tensile strength of 7.1 kg. wt. was obtained.

EXAMPLE 37

2.5 mg. of finely powdered 2-hydroxyacetophenone oxime were applied to an area prepared for splicing and the area was then sealed under the conditions of Example 1. A tear strength of 6.6 kg. wt. was obtained.

EXAMPLE 38

About 2.5 mg. of molten 2-hydroxyacetophenone oxime were applied from a nozzle to an area prepared for joining by splicing. After sealing under the conditions of Example 1, an ultimate tensile strength of 7.0 kg. wt. was obtained.

EXAMPLE 39

One end of a polyester film and one end of a cellulose acetate film were prepared for sealing by splicing and sealed with a 1:1 mixture of 2-hydroxyacetophenone oxime/resorcinol under the condition of Example 1. The following results were obtained:

Tensile strength: 5.3 kg. wt.
Shear strength: 1338
Heat resistance: +

EXAMPLE 40

A 30% solution of salicylic aldoxime in acetone was applied to the ends of a polyester and a cellulose acetate film prepared for sealing by splicing and the solvent was evaporated off. The end of one film was heated to 70° C. and the other to 120° C.; the two film ends were subjected at this temperature difference to a pressure of 0.5 kg. wt./mm.² for 10 seconds. The seal obtained in this way had an ultimate tensile strength of 6.2 kg. wt. It is immaterial whether it is the end of the polyester film or the end of the cellulose acetate film that has the lower temperature.

EXAMPLE 41

The layer of resin on the end of a magnetic tape was scraped off over a width of about 2 mm. A 30% solution of salicylic aldoxime in acetone was applied to this end of the tape and to the rear surface of the end of an untreated tape, and the solvent was evaporated off. A perfectly satisfactory durable seal was then produced applying the conditions of Example 1.

Similar results are obtained if the ends of the film to be spliced were not planned at an oblique angle as shown in FIG. 1, but only that part of the image-carrying layer at the surfaces to be spliced was scraped away. This method is shown in FIG. 2.

What is claimed is:

1. A method of splicing photographic films containing at least one image carrying layer on a polyester support comprising the steps of applying an oxime to areas of the polyester support, said areas being arranged to face each other in a joint of the film, said oxime being a swelling agent for said polyester support, pressing together the facing areas coated with the oxime and heating the pressed facing areas to a temperature up to 200° C.

2. A method as defined in claim 1, wherein the swelling agent is an oxime of an aldehyde or ketone of the benzene or naphthalene series, and wherein the facing surfaces are heated to a temperature of between 100–140° C.

3. A method as defined in claim 1, wherein as an additional swelling agent a mono- or polyhydric phenol is applied.

References Cited

UNITED STATES PATENTS

| 2,301,664 | 11/1942 | Eggert et al. | 156—157 |
| 3,409,493 | 11/1968 | McIntyre et al. | 156—307 |

CARL D. QUARFORTH, Primary Examiner

B. H. HUNT, Assistant Examiner

U.S. Cl. X.R.

156—159, 307